(12) United States Patent
Bossard

(10) Patent No.: US 6,303,009 B1
(45) Date of Patent: Oct. 16, 2001

(54) HYDROGEN GENERATOR WITH FEEDBACK CONTROL

(76) Inventor: Peter R. Bossard, 33 Oswin Turn, Langhorne, PA (US) 19047

( * ) Notice: Subject to any disclaimer, the term of this patent is extended or adjusted under 35 U.S.C. 154(b) by 0 days.

(21) Appl. No.: 09/440,192

(22) Filed: Nov. 15, 1999

(51) Int. Cl.[7] .............................. C25B 9/00; C25B 9/04
(52) U.S. Cl. ................................ 204/228.4; 204/228.6; 205/637
(58) Field of Search ............................ 204/228.1, 228.2, 204/228.4, 228.5, 228.6; 205/628, 637, 633

(56) References Cited

U.S. PATENT DOCUMENTS

| | | | |
|---|---|---|---|
| 4,822,469 | * | 4/1989 | Shimomura et al. ............ 204/228.5 |
| 5,037,518 | * | 8/1991 | Young et al. ................... 204/228.5 |
| 5,733,422 | * | 3/1998 | Lin ................................. 204/228.2 |
| 6,033,549 | * | 3/2000 | Peinecke et al. ................ 205/335 |
| 6,126,797 | * | 10/2000 | Sato et al. ..................... 204/272 |

* cited by examiner

Primary Examiner—Kathryn Gorgos
Assistant Examiner—Wesley A. Nicolas
(74) Attorney, Agent, or Firm—LaMorte & Associates P.C.

(57) ABSTRACT

A simple hydrogen generator system for maintaining zero PSI across the proton exchange membrane while generating ultra pure hydrogen gas at high pressure from water. The system includes a proton exchange membrane across which an electrolysis reaction is induced, thereby producing hydrogen gas on a first side of the proton exchange membrane and oxygen gas on a second side of the proton exchange membrane. The current source used to induce the electrolysis reaction is computer controlled so as to maintain a near constant pressure of hydrogen, even as hydrogen is drawn from the assembly. By minimizing the pressure differential across the proton exchange membrane, a more durable and efficient hydrogen generator is produced.

14 Claims, 2 Drawing Sheets

HYDROGEN GENERATOR WITH FEEDBACK CONTROL

BACKGROUND OF THE INVENTION

1. Field of the Invention

The present invention relates to systems and methods of generating hydrogen gas from water using an electrolysis reaction. More particularly, the present invention is related to systems and methods of generating hydrogen gas where an electrolysis reaction is induced across a proton exchange membrane.

2. Description of the Prior Art

For many years, it has been known that water can be separated into hydrogen gas and oxygen gas using an electrolysis reaction. Over the years there have been many production of hydrogen gas, such devices are commonly known as hydrogen generators.

In some of the more efficient prior art hydrogen generators, an electrolysis reaction is induced across a proton exchange membrane. To increase the output pressure of hydrogen, a pressure differential is commonly produced across the proton exchange membrane. However, proton exchange membranes are thin and are easily damaged. Proton exchange membranes by themselves cannot withstand any significant pressure differential without rupturing. Accordingly, the proton exchange membranes in many prior art devices are reinforced with wire mesh screens that support the proton exchange membranes. During the operation of such prior art hydrogen generators, the proton exchange membrane is biased against a wire mesh screen by a pressure on the hydrogen side of the membrane. The pressure on the membrane is greater on the hydrogen side than it is on the oxygen side, which is usually at atmospheric pressure. The output pressure of the hydrogen gas is equal to the pressure that is being applied to hydrogen side of the proton exchange membrane. The wire mesh screen typically has a 70% to 80% opening this results in the pressure on the screen to be 3.3 to 5 times higher than the output pressure of the hydrogen gas. This causes the proton exchange membrane to wear rapidly. This is due to the large forces developed at the points of contact with the screen and the openings in the screen, where the proton exchange membrane is being stretched between the supporting elements of the screen. After a relatively short operational life, holes begin to appear in the proton exchange membrane at points where the membrane contacts the wire mesh screen. Once the holes add up to a predetermined minimum area, for a given size hydrogen generator, the proton exchange membrane is incapable of producing the hydrogen required and the hydrogen generator ceases to function adequately.

In prior art designs, a single hydrogen electrolysis cell typically has more than 15 separate parts not counting nuts, bolts and washers. These parts include as many as eight titanium screens, titanium supporting plates and rubber like sections that must be glued together. The net result is that the hydrogen generating devices using proton exchange membranes are expensive, complex, difficult to assembly and unreliable. These designs also have significant pressure variations across the proton exchange membrane causing accelerated wear and decreased performance of the hydrogen generator.

In prior art hydrogen generators, certain manufacturers developed designs that stack multiple proton exchange membranes atop one another. In such designs, each of the proton exchange membranes is supported by its own set of wire mesh screens. Although holes do develop in each of the proton exchange membranes, the life of the hydrogen generator is prolonged by the redundant positioning of the proton exchange membranes and therefore the increased capacity of the initial hydrogen generator. Hydrogen generators that use multiple proton exchange membranes, however, are significantly more expensive due to the cost of the multiple proton exchange membranes and the complexity of the design. This stacking of proton exchange membranes significantly reduces the manufacturability and reliability of such hydrogen generating devices.

Another problem associated with prior art hydrogen generators is that the electrolysis reaction tends to warm the water being used in the electrolysis reaction. This in part is due to the oxidation of the titanium that is used in the electrolysis chamber, which increases the resistance in the current path. The excess heat generated is in close proximity to the proton exchange membrane. As the water warms, the vapor pressure of the water increases. The water vapor contaminates the hydrogen gas being produced. The hydrogen gas in many cases must therefore be processed through a separate purification procedure before the hydrogen gas can be used. The problem of heated water is particularly prevalent in hydrogen generator designs that use multiple proton exchange membranes. In such prior art hydrogen generators, each proton exchange membrane chamber tends to be thermally isolated. It is therefore difficult to remove heat from the internal chambers and reduce the water vapor pressure to acceptable levels. The proton exchange membrane also degrades more rapidly at higher temperatures thereby further reducing the useful life of the hydrogen generator.

A need therefore exists in the art for a hydrogen generator that operates with a proton exchange membrane that does not have a pressure differential across the proton exchange membrane, thereby eliminating the production of wear abrasions in the membrane. A need also exists for a hydrogen generator that is capable of using only a single high efficiency proton exchange membrane and that operates at reduced water temperatures and can be actively cooled if necessary and at the same time have a high output gas pressure with little differential strain on the proton exchange membrane. These types of cells can then be stacked, connecting the gas outputs of each cell in parallel to achieve the desired hydrogen flow. These needs are met by the present invention system and method as is described and claimed below.

SUMMARY OF THE INVENTION

The present invention is a hydrogen generator system for generating hydrogen gas from water. The system includes a proton exchange membrane across which an electrolysis reaction is induced, thereby producing hydrogen gas on a first side of the proton exchange membrane and oxygen gas on a second side of the proton exchange membrane. The gas produced by the system is regulated by a unique high efficiency, high speed constant current power supply that controls the flow of current across the proton exchange membrane. This power supply both monitors and controls the current through the proton exchange membrane. In addition the voltage drop across the proton exchange membrane or membranes are also monitored if more than one membrane is placed in series.

A hydrogen gas chamber receives the hydrogen gas produced on the first side of the proton exchange membrane. Similarly, an oxygen gas chamber receives the oxygen gas produced on the second side of the proton exchange membrane. The proton exchange membrane is uniquely mounted so that there is a notable increase in gas produced per unit area, as compared to prior art systems.

A pressure regulator mechanism is provided for maintaining a predetermined pressure differential between the hydrogen gas chamber and the oxygen gas chamber. By maintaining a pressure differential of near zero between the gas chambers, the proton exchange membrane is not differentially stressed and both the life and performance of the hydrogen generator are significantly improved. In addition, because of the good thermal connection to the anode and cathode in the proton exchange membrane the operating temperature of the membrane is kept cool. This also increases the reliability and life of the hydrogen generator.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Figure 1:
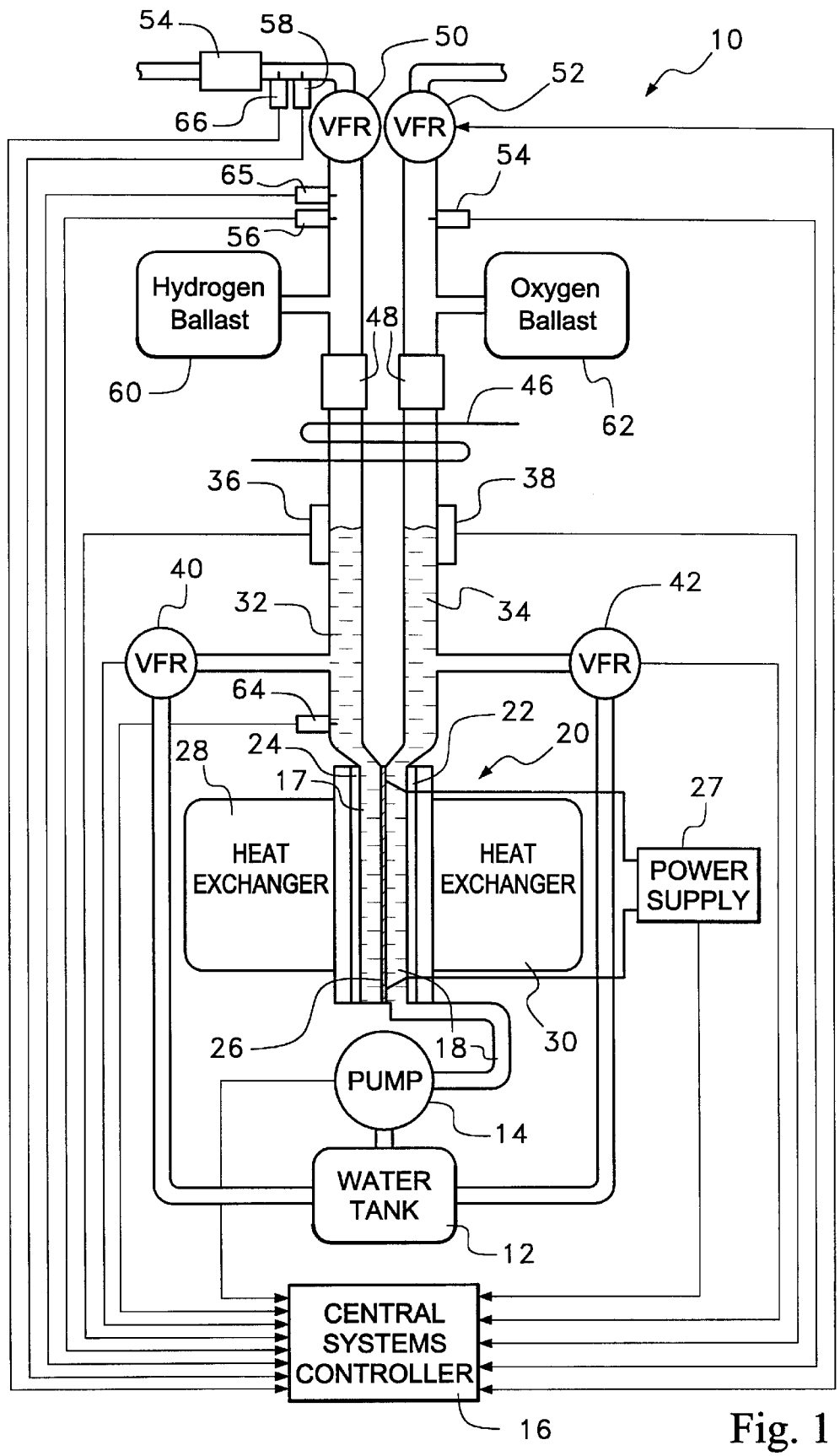
FIG. 1 is a schematic of an exemplary embodiment of a hydrogen generator system in accordance with the present invention.
Figure 2:
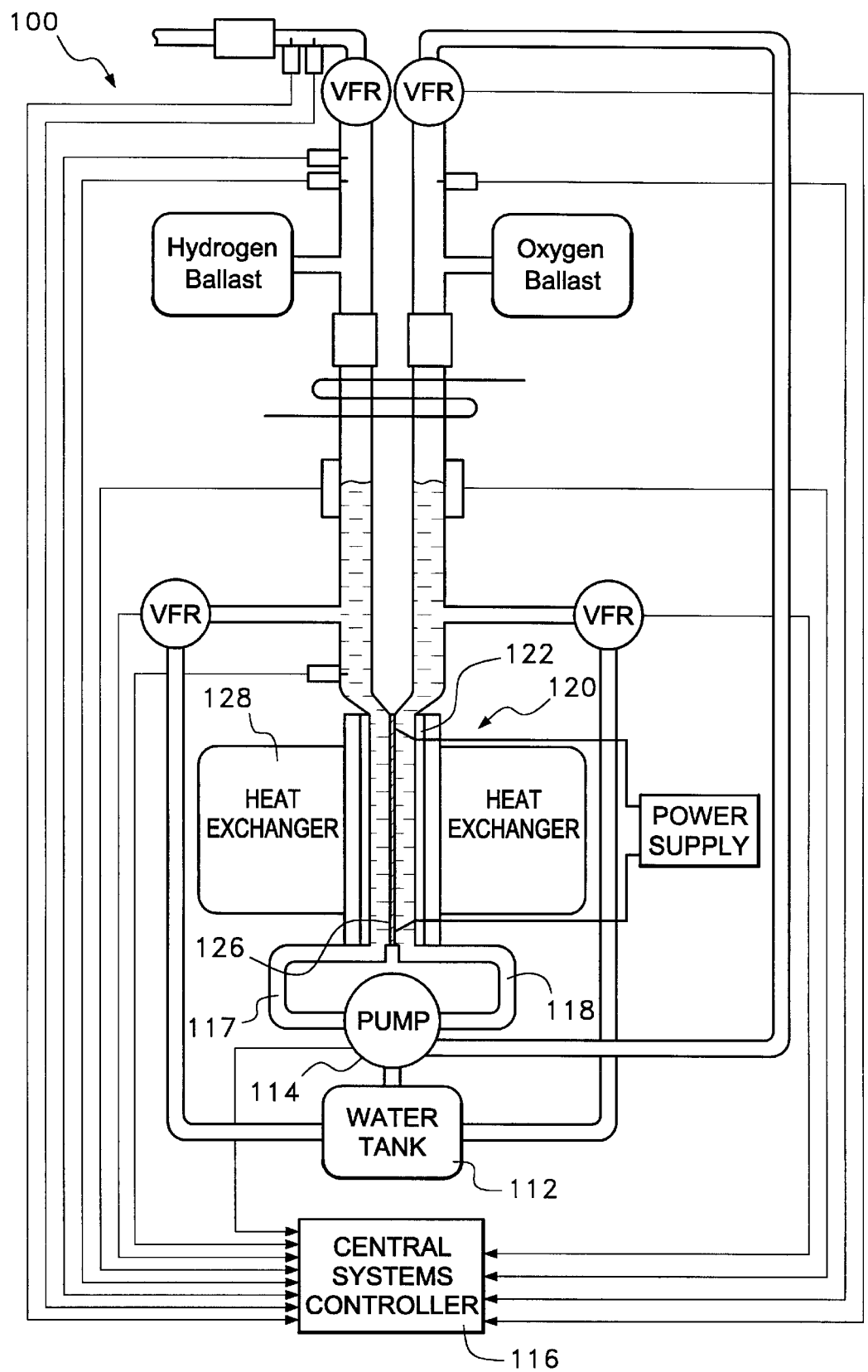
FIG. 2 is another exemplary embodiment of the present invention.

Referring to FIG. 1, a schematic of an exemplary embodiment of a hydrogen generating system 10 is shown. The hydrogen generating system 10 includes a water tank 12 that contains the water that is to be turned into hydrogen gas and oxygen gas by electrolysis. The water from the water tank 12 is pumped out of the tank 12 by a variable speed pump 14. The variable speed pump 14 is electronically controlled by a central systems controller 16. The variable speed pump 14 pumps water into the anode side of an electrolysis cell 20. This pump may be driven using various electric motors or a gas power pump driven by the oxygen produced at pressure, as a byproduct of the hydrogen generating system 10.

The electrolysis cell 20 contains an anode terminal 22, where the oxygen is formed and a cathode terminal 24, where the hydrogen is formed. A single proton exchange membrane 26 is disposed between the anode terminal 22 and the cathode terminal 24. Water enters the proton exchange membrane 26 from the anode side of the cell and fills the area between the anode terminal 22 and the proton exchange membrane 26. Water then permeates (this is a first order chemical reaction) into the proton exchange membrane 26 and fills the area between the cathode terminal 24 and the proton exchange membrane 26.

The volume of hydrogen gas and oxygen gas produced in a given period of time is controlled by the flow of current supplied to the proton exchange membrane 26. A power supply 27 is provided. The power supply produces a current output that is programmable. The output of the power supply 27 is coupled to the proton exchange membrane 26. The programmable power supply's 27 current output across the proton exchange membrane 26 is programmed by the central systems controller 16 to maintain the pressure differential across the proton exchange membrane 26 at an appropriate value.

A heat exchanger 28 is connected to the cathode terminal 24. Similarly, an additional heat exchanger 30 can also be connected to the anode terminal 22. The heat exchangers 28, 30 can be cooled by convection, forced air, water, or actively cooled with Peltier devices.

The area between the cathode terminal 24 and the proton exchange membrane 26 defines a first water pathway 17. The area between the anode terminal 22 and the proton exchange membrane 26 defines a second water pathway 18. Water flowing through the first water pathway 17 enters a first chamber 32 positioned above the electrolysis cell 20. Similarly, water passing through the second water pathway 18 enters a second chamber 34 positioned above the electrolysis cell 20. A first water level sensor 36 is disposed in the first chamber 32. A second water level sensor 38 is disposed in the second chamber 34. Both water level sensors 36, 38 sense when the level of water is within an acceptable operational range. The output of both water level sensors 36, 38 is connected to the central systems controller 16.

A first variable water flow restrictor 40 is connected to the first chamber 32. The first variable water flow restrictor 40 is controlled by the central systems controller 16. When the first water level sensor 36 detects that the level of water is too high, the flow of water through the first variable water flow restrictor 40 is increased and the level of water in the first chamber 32 is lowered to an acceptable level. If the water level in the first chamber 32 is too low, the flow of water through the first variable water flow restrictor 40 is reduced until the water level rises to an acceptable level.

The level of water in the second chamber 34 is controlled in the same manner as described above, using the second water level sensor 38 and a second variable water flow restrictor 42.

The water passing through either variable flow water restrictor 40 or 42 passes through de-bubblers 44 and 46 respectively where excess gas dissolved in the water escapes before entering the water tank 12.

Hydrogen gas produced by electrolysis in the electrolysis cell 20 rises up through the first chamber 32. Similarly, oxygen gas produced in the electrolysis cell 20 rises up through the second chamber 34. The hydrogen gas contained in the first chamber 32 and the oxygen gas contained in the second chamber 34 are both contaminated with water vapor. The level of water vapor is reduced in three ways. First, the operating temperature of the electrolysis cell 20 is kept at a predetermined temperature by the heat exchanger 28, 30 that attach to he electrolysis cell 20. The lower operating temperature of the electrolysis cell 20 directly correlates to lower vapor contamination. For example, if the water in the electrolysis cell 20 is kept at 5° Celsius, the water vapor is 6.5 mm of Hg. If the temperature is increased ten fold to 50° Celsius, the vapor pressure increases to 92.5 mm of Hg, which is an increase of eighteen fold. Accordingly, it is preferred that the operating temperature of the electrolysis cell 20 be maintained under 10° Celsius.

A second procedure used to reduce water vapor contamination is to position a condenser coil 46 in both the first chamber 32 and the second chamber 34. Water vapor condenses on the condenser coil 46 and falls back into the first and second chambers 32, 34, respectively. Water flow restrictors 48 are positioned in the first and second chambers, respectively, just above the condenser coil 46. The presence of the water flow restrictors 48 prevents water bubbles from percolating further up within the first and second chambers, 32, and 34.

A first pressure sensor 56 detects the pressure of hydrogen gas in the first chamber 32. A second pressure sensor 54 detects the pressure of oxygen gas in the second chamber 34. A third pressure sensor 59 detects the pressure of pure hydrogen gas 58. These pressure reading are forwarded to the central controller 16. To the user the important parameter is the output pressure read by sensor 59. The user of the hydrogen generator 10 inputs the required pressure of the pure hydrogen gas output 58 and the hydrogen generator 10 dynamically sets both the current through the proton exchange membrane and the relief pressure on the pressure relief valve 52 so that the pressure of the pure hydrogen output 58 is at the correct value.

At the top of the first chamber 32 there can be disposed a palladium purifier 50 mentioned above. The pure hydrogen output 58 of this purifier may have a pressure sensor 59. The output of the pressure sensor 59 can be used by the system controller to control the current output of the high speed constant current source. The output pressure of the pure hydrogen can be to within 0.1% when the flow of hydrogen gas required does not exceed the capacity of the hydrogen generator 10. A check valve 61 may be used on the pure hydrogen output to prevent contamination from entering the palladium purifier when the generator is turned off. A check valve 53 can also place in series in the bleed line to prevent contamination from entering the palladium purifier when the generator is turned off.

At the top of the second chamber 34 is disposed a variable gas pressure relief valve 52. The output flow of hydrogen gas from the first chamber 32 is determined by the demand of the user. The output flow of oxygen gas from the second chamber 34, is determined by the requirement that the oxygen pressure be kept at a value that minimizes the pressure gradient across the proton exchange membrane. This is accomplished by adjusting the pressure relief valve 52, above the second chamber 34, to a value that is large enough so that when the hydrogen in the first chamber 32 reaches this pressure the user can obtain the flow required. The pressure differential across the proton exchange membrane 26 is kept at the desired value usually near zero PSI when measured differentially. The pressure in the second chamber 34 is determined by adjusting the variable gas pressure relief valve 52 so that the pressure in the first chamber 32 and the second chamber 34 are equal. The pressure in the first chamber 32 is higher than the output pressure measured by sensor 59 of the hydrogen gas required because of the pressure drop in the palladium diffusion cell. The pressure in the first chamber 32 and the second chamber 34 are maintained at equal values under the various hydrogen flow conditions that may be required by the user as described below.

When the user demand for hydrogen gas changes, the pressure measured by pressure sensor 59 will tend to either increase or decrease depending on whether the user demand decreased or increased respectively. In order to maintain a steady pressure reading on sensor 59 the pressure in the first chamber 32 must change. The central systems controller 16 decreases or increases the current to the proton exchange membrane 26 as necessary to maintain the pressure measured by sensor 59 at the desired pressure value. The pressure in the second chamber 34 will change to hold the differential pressure across the proton exchange membrane near zero as the user hydrogen flow requirement changes. As the pressure in the first chamber 32 changes the central systems controller 16 decreases or increases the pressure in the second chamber 34 by adjusting the relief pressure valve 52. The variable pressure relief valve 52 on the second chamber 34 regulates the pressure in the second chamber 34 so that the pressure in the second chamber 34 is equal to the pressure in the first chamber 32. Oxygen is vented when the pressure in the second chamber 34 exceeds the relief pressure set by the pressure relief valve 52. The result is an equilibrium that results in equal pressures in both the first chamber 32 and the second chamber 34 while maintaining a constant pressure on the pure hydrogen output gas 58 up to the generating capacity of generator.

Preferably, the relative pressure between the first chamber 32 and the second chamber 34 is maintained at zero pounds per square inch. However, the pressure differential across the proton exchange membrane 26 can be held at other pressures, for the particular cell configuration or application.

The shown first and second pressure sensor 54, 56 can be replaced by a single differential pressure sensor that is disposed between the first chamber 32 and the second chamber 34. Two separate pressure sensors 54, 56 may be preferred to prevent any possible cross contamination of gasses, should the differential pressure sensor fail.

Above the first pressure chamber 32 can be disposed a palladium purifier 50. The palladium purifier 50 purifies the output hydrogen so that it typically contains less than 1 part per billion of impurities. The bleed line 55 allows water vapor and other impurities to continually be purged from the palladium purifier 55. The ultra pure hydrogen output is now available to the user.

The palladium purifier 50 is not required if it is not necessary to remove all the water vapor present in the output hydrogen gas. When the palladium purifier is not used it can be replaced by a flow restrictor that limits the rate of pressure change in the first chamber 32. The current output from the high speed constant current source is adjusted so that the rate of hydrogen produced meets the demand required by the user.

The actual volume of the first chamber 32 and the second chamber 34 is relatively small. Accordingly, sudden changes in gas flow requirements from the first chamber 32 has a tendency to cause the pressure to fluctuate in the first chamber 32 because of the finite response time of the system. To make the overall system 10 more capable of responding to changing demands, with only a very small pressure fluctuate on the proton exchange membrane 26, a ballast chamber 60 for hydrogen can be attached to the first chamber 32. Similarly and a ballast chamber 64 for oxygen can be attached to the second chamber 34, if there were demands on the oxygen gas. An example would be if the oxygen output were also being used and the requirements were fluctuating or if the high-pressure oxygen were being used as the driving force for the water pump 14. The added ballast chambers 60, 62 increase the volume of hydrogen gas and oxygen gas stored in the first and second chambers 32, 34, respectively. The total volumes are still small typically less than 50 cc. However, this small amount of volume increases the time constant associated with the pressure changes to ten or more milliseconds and eases the demand on the central systems controller 16. The system 10 can therefore more readily respond to changing supply demands while minimizing the pressure fluctuate. Under various conditions the additional ballast chambers 60, 62 are not needed.

Temperature sensor 64 is disposed in the first chamber 32. The temperature sensor 64 detects the temperature of the water above the electrolysis cell 20. By measuring the temperature of the water with temperature sensor 64, the degree of water vapor in the generated hydrogen gas can be calculated by the central systems controller 16. A second temperature sensor 66 may be disposed in the first chamber 32. The temperature sensor 66 detects the temperature of the gas above the condensing coils 46. A third temperature sensor 68 can be use to measure the ambient temperature. The temperature sensors can be used by the central systems controller 16 to determine the effectiveness of the condensing coils 46, the proton exchange heat sinks and the general condition of the hydrogen generating cell 20.

In the hydrogen generator system 10 described, the pressure within the electrolysis cell 20, on one side of the proton exchange membrane 26 is regulated with respect to the pressure on the opposite side of that membrane 26, such that the hydrogen flow required by the user is dynamically met. In many cases the user needs a reliable source of high pressure pure hydrogen were the demand varies slowly or is constant. In this case the ballast 60 and 62 are not needed to keep the differential pressure across the proton exchange membrane close to zero. If the pressure differential is kept at zero, there are no differential pressure forces acting on the proton exchange membrane 26. Accordingly, the proton exchange membrane 26 is not differentially stressed. Accordingly, there are no forces that cause the proton exchange membrane 26 to tear or wear. The life of the proton exchange membrane 26 is therefore significantly longer than prior art systems here the proton exchange membrane is differentially stressed and these differential forces can exceed 400 PSI considerably reducing the life of the membrane. In the prior art systems the differential forces are placed on the proton exchange membrane and cause excessive wear and tear.

It will be understood that the specifics of the hydrogen generator described above illustrates only one exemplary embodiment of the present invention. Other embodiments of the present invention can be made. For example, the temperature sensors can be removed if it is not necessary to monitor the temperature of the cell, the ambient or the gas produced. These measurements are used primarily for measuring the condition of the hydrogen generator and the temperature of the environment.

Another modification that can be easily introduced is to place multiple generator cells in series so that the electrical current flows through each of them serially but the gas output is taken out in a parallel mode for both gas outputs. For two generator cells this would double the gas generating capability while at the same time keeping the differential pressure across each cell near zero, without increasing the number of pressure sensors. Any number of cells can be put in series with the appropriate programmable current supply.

It will therefore be understood that a person skilled in the art can therefore make numerous alterations and modifications to the shown embodiment utilizing functionally equivalent components to those shown and described. All such modifications are intended to be included within the scope of the present invention as defined by the appended claims.

What is claimed is:

1. A system for generating hydrogen, comprising:
   a proton exchange membrane having a first side and a second side across which an electrolysis reaction is induced;
   a first chamber having a lower section and an upper section, wherein said lower section contains a first volume of water and is exposed to said first side of said proton exchange membrane;
   a second chamber having a lower section and an upper section, wherein said lower section contains a second volume of water and is exposed to said second side of said proton exchange membrane;
   a current power supply for regulating said electrolysis reaction across said proton exchange membrane;
   a pressure sensor coupled to said first chamber, wherein said pressure sensor monitors pressure in said upper section of said first chamber;
   a controller, coupled to said pressure sensor, for controlling said current power supply, so as to maintain a predetermined output pressure and a predetermined pressure differential between said first chamber and said second camber; and
   a cooling assembly for cooling the first volume of water in said first chamber and said second volume of water in said second chamber, wherein said cooling assembly is coupled to said controller and said controller regulates said cooling assembly to maintain the water in said first and second chambers within a predetermined temperature range.

2. The device according to claim 1, further including a variable pressure relief valve coupled to said second chamber for maintaining said second chamber near a constant pressure.

3. The device according to claim 1, wherein said current power supply is a high speed variable constant current power supply.

4. The device according to claim 1, wherein said predetermined pressure differential is between zero pounds per square-inch and plus and minus twenty pounds per square-inch.

5. The device according to claim 1, further including a first water level sensor in said first chamber and a first water return line, wherein water flow through said first water return line is controlled by said first water level sensor so that water in said first chamber is maintained at a predetermined level.

6. The device according to claim 5, further including a second water level sensor in said second chamber and a second water return line, wherein water flow through said second water return line is controlled by said second water level sensor so that water in said second chamber is maintained at a predetermined level.

7. The device according to claim 1, further including a differential pressure sensor disposed between said first chamber and said second chamber, wherein said differential pressure sensor is coupled to said controller and said differential pressure sensor measures pressure differentials between said first chamber and said second chamber.

8. The device according to claim 1, further including temperature sensors for measuring the temperature of water in said first chamber and said second chamber, wherein said temperature sensors are coupled to said controller and are used to monitor said predetermined temperature range.

9. The device according to claim 1, wherein said current power supply regulates current flow through said proton exchange membrane as a function of the pressure in the first chamber relative the pressure in said second chamber.

10. The device according to claim 1, further including a pump for pumping water into said first chamber and said second chamber, wherein said pump is powered by the flow of oxygen from said second chamber.

11. The device according to claim 1, further including a gas ballast chamber coupled to said first chamber, wherein said gas ballast chamber retains a predetermined volume of gas at the same pressure as said first chamber.

12. The device according to claim 1, further including a gas ballast chamber coupled to said second chamber, wherein said gas ballast chamber retains a predetermined volume of gas at the same pressure as said second chamber.

13. A system for generating hydrogen, comprising:
a proton exchange membrane having a first side and a second side across which an electrolysis reaction is induced;
a first chamber having a lower section and an upper section, wherein said lower section is exposed to said first side of said proton exchange membrane;
a second chamber having a lower section and an upper section wherein said lower section is exposed to said second side of said proton exchange membrane;
a current power supply for regulating said electrolysis reaction across said proton exchange membrane;
a controller for controlling said current power supply; and
a pressure differential sensor coupled to said controller for measuring any pressure differential between said first chamber and said second chamber;
wherein said controller directs said current power supply to regulate current flow through said proton exchange membrane as a function of said pressure differential.

14. A system for generating hydrogen, comprising:
a proton exchange membrane having a first side and a second side across which an electrolysis reaction is induced;
a first chamber having a lower section and an upper section, wherein said lower section is exposed to said first side of said proton exchange membrane;
a second chamber having a lower section and an upper section wherein said lower section is exposed to said second side of said proton exchange membrane;
a current power supply for regulating said electrolysis reaction across said proton exchange membrane;
a controller for controlling said current power supply, so as to maintain a predetermined output pressure; and
a pump for pumping water into said first chamber and said second chamber, wherein said pump is powered by the flow of oxygen from said second chamber.

* * * * *